United States Patent [19]

Feldmann et al.

[11] Patent Number: 4,661,585

[45] Date of Patent: Apr. 28, 1987

[54] PULVERULENT POLYAMIDE COATING COMPOSITIONS WHEREIN THE POLYAMIDE HAS AS AN AVERAGE AT LEAST NINE CARBON ATOMS PER CARBONAMIDE GROUP

[75] Inventors: Rainer Feldmann, Marl; Günter Hess, Haltern, both of Fed. Rep. of Germany

[73] Assignee: Hüls AG, Marl, Fed. Rep. of Germany

[21] Appl. No.: 781,599

[22] Filed: Sep. 30, 1985

[30] Foreign Application Priority Data

Nov. 15, 1984 [DE] Fed. Rep. of Germany ....... 3441708

[51] Int. Cl.[4] .............................................. C08G 69/46
[52] U.S. Cl. .................................... 528/502; 525/432; 528/310; 528/323; 528/326
[58] Field of Search ............... 528/502, 326, 310, 323; 525/432

[56] References Cited

U.S. PATENT DOCUMENTS

| | | | |
|---|---|---|---|
| 3,966,838 | 6/1976 | Feldmann et al. | 525/432 |
| 4,273,919 | 6/1981 | Feldmann et al. | 528/502 |
| 4,334,056 | 6/1982 | Meyer et al. | 525/432 |
| 4,487,895 | 12/1984 | Feldmann et al. | 525/432 |

*Primary Examiner*—Harold D. Anderson
*Attorney, Agent, or Firm*—Wells & Wells

[57] ABSTRACT

Pulverulent polyamide coating compositions consisting of a mixture of similar polyamides having on the average at least nine aliphatically bound carbon atoms per carbonamide group and of different relative viscosity, the difference in relative viscosities amounting to at least 0.04 and at most 0.1 units.

The mixtures are obtained by mixing powders prepared both by precipitation or by cold grinding or also by mixing the corresponding granulates which subsequently are then cold ground.

12 Claims, No Drawings

PULVERULENT POLYAMIDE COATING COMPOSITIONS WHEREIN THE POLYAMIDE HAS AS AN AVERAGE AT LEAST NINE CARBON ATOMS PER CARBONAMIDE GROUP

CROSS REFERENCE TO A RELATED APPLICATION

Applicants claim priority under 35 USC 119 for application P 34 41 708.7, filed Nov. 15, 1984 in the Patent Office of the Federal Republic of Germany.

BACKGROUND OF THE INVENTION

The field of the invention is polyamide powders for the coating of substrates and the invention is particularly concerned with pulverulent polyamide coating compositions based on polyamides having an average of at least nine carbon atoms per carbonamide group for use in fusion coating procedures.

The state of the prior art of producing polyamide powders may be ascertained by reference to U.S. Pat. Nos. 2,698,966; 2,742,440; 2,975,128; 3,203,822; 3,299,009; 3,476,711; 3,927,141; and 3,966,838; British Patent Nos. 535,138 and 830,757; West German Published application Nos. 1,570,392; 1,669,821; 1,210,183; 1,267,428; 1,520,551 and 1,495,147; East German Patent Nos. 7283; 23,607; 24,307 and 25,173; French Patent Nos. 951,924 and 1,384,988 and Swiss Patent No. 582,517; and the Kirk-Othmer "Encyclopedia of Chemical Technology" 2nd Ed., Vol. 16 (1968), under the section "Polyamide (Plastics)", pages 88–105, particularly page 92—polylauryllactam (nylon-12), and polyundecanamide (nylon-11), page 101 Solution Processes, and Powder Processing, pages 101–102, the disclosures of which are incorporated herein.

The flame spraying and fluidized bed coating of nylon on a metal base is disclosed in U.S. Pat. No. 3,203,822. U.S. Pat. No. 3,410,832 discloses the preparation of polymers and copolymers of lauryllactam It is also known from the disclosures of Chem. Ind. 1968, pp 783 and Modern Plastics, February 1966, pp 153–156, that polyamide powders which are based upon polyamides having at least 11 carbon atoms are useful in the production of metallic coatings similar to enamels.

The compositions of the present invention are applied by the fusion coating method, that is by the fluidized bed method, the flame spray method or the electrostatic coating method. The polyamide powders are obtained by precipitating the polyamide from solutions as disclosed in British Patent No. 688,771 or U.S. Pat. No. 4,334,056, or by grinding the polyamide granulates as disclosed in U.S. Pat. Nos. 4,143,025 and 4,195,162.

A variety of approaches for improving the properties of polyamide based coating compositions are known from the disclosures of German Patent No. 1,271,286; U.S. Pat. Nos. 3,900,607; 3,927,141; and 4,273,919; and British Patent No. 1,392,949.

Nevertheless the coating powders which are known still require further improvements. With particular regard to the edges of very small radius of curvature, that is for thin wires and especially for molded articles made from such wires, for instance baskets, irregularities take place especially at the crossing sites, depending on the position and the stress placed on the coating.

Thus, pore free coatings are achieved at the crossing points of wire grids using polyamide powders having low molecular weights (small relative spec. viscosity values), however, the edges of the wire ends are only inadequately coated. Powders of higher molecular weights are not helpful because pore formation increases substantially and the required elasticity is no longer retained.

SUMMARY OF THE INVENTION

It is, therefore, an object of the present invention to provide pulverulent polyamide coating compositions useful in the fusion coating method which retain the good properties known heretofore and which furthermore provide coatings with outstanding smoothness having pore free surfaces and which furthermore provide adequate coverage with high elasticity at sharp edges.

The pulverulent polyamide coating compositions of the present invention, in addition to the conventional additives, consist of intimate mixtures of:

(I) 80 to 20% by weight of a polyamide having on the average at least nine aliphatically bound carbon atoms per carbonamide group and having a relative viscosity from about 1.50 to 1.65; and correspondingly (II) 20 to 80% by weight of a similar polyamide having a relative viscosity of about 1.55 to 1.75 where there is a difference between the relative viscosities of component A and component B of at least 0.04 and at most 0.1 units.

The intimate mixtures of components (I) and (II) are preferably obtained by:

(a) mixing precipated powders of components (I) and (II);

(b) mixing cold ground powders of components (I) and (II) and (c) mixing granules of components (I) and (II) and then cold grinding them.

In a particular embodiment, components (I) and (II) are aliphatic homopolyamides represented by the basic block formula:

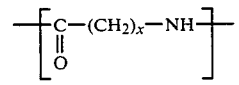

wherein x is an integer from 9 to 12.

DESCRIPTION OF THE PREFERRED EMBODIMENTS

Examples of polyamides having on the average at least nine aliphatically bound carbon atoms include homopolyamides such as polylauryllactam (11 carbon atoms) and polyundecanoic acid amide (10 carbon atoms).

Further included are copolymers such as polyamides consisting of: 80% by weight lauryllactam and 20% by weight caprolactam; 90% lauryllactam and 10% of a salt of hexamethylenediamine with adipic acid; 95% lauryllactam and 5% of a salt of isophoronediamine and dodecanoic diacid; 90% lauryllactam and 10% aminoundecanoic acid; and 90% aminoundecanoic acid and 10% caprolactam.

Preferably mixtures of homopolyamides or of homopolyamides and copolyamides are used, provided the mixtures contain on the average at least nine aliphatically bound carbon atoms per carbonamide group.

Preferred aliphatic groups are linear CH$_2$ groups, however branched chain aliphatic groups may also be present.

The proportion of homopolyamides and copolyamines in the mixture is 10:90 to 90:10 percent by weight. Preferably mixtures with proportions of 60:40 to 40:60 percent by weight are used.

Especially preferred are homopolyamides, in particular lauryllactam and polyundecanoic acid amide.

Component (I) of the mixtures of the present invention has a low value of viscosity of solution, namely a value $\eta_{rel}$ of 1.50 to 1.65 (measured in m-cresol at 25° C. for a concentration of 0.5 g/l. Component (I) may be a single component or a mixture according to the above definition of the polyamides.

Component (I) is contained in the total mixture of (I) plus (II) in an amount of 20 to 80, preferably 25 to 75, especially 33 to 67% by weight.

Component (II) is a similar polyamide having on the average at least nine aliphatic bound carbon atoms per carbonamide group and like component (I) it is therefore a homopolyamide or a mixture of homopolyamides or monoamides and copolyamides. Component (II) differs by its higher viscosity which is $\eta_{rel} = 1.55$ to 1.75.

The portion of component (II) in the total mixture is accordingly set and, therefore, it is 80 to 20, preferably 75 to 25, especially 67 to 33% by weight.

The difference in the values of the relative viscosity between Components (I) and (II) is at least 0.04 and at most 0.1 units.

It is essential furthermore that powders made by precipitation are only mixed as powders. Therefore such components preclude mixing the granulates and then jointly precipitating this mixture.

On the other hand it is possible to cold grind granulate mixtures, or also to mix subsequently powders obtained from the cold grinding process.

Mixing may be carried out conventionally, for instance in fluidizing containers or rapid mixers. The mixing of the powder components can take place prior to the final grading, that is prior to sifting or air screening. However, the prevísouly classified powders can also be mixed.

The mixtures may contain conventional additives such as stabilizers, pigments, dyes and antistatic agents.

SPECIFIC EXAMPLES

Metal grids of wires having diameters between 0.8 and 3.5 mm and welded together are used for coating. As assessment was made of the number of pores formed at the grid crossing points, the covering of the edges (1 = very thick cover, 5 = edge almost bare), of the coating elasticity by bending a wire and until the coating tears at the weld site (1 = no tearing when bending by 135°, 2 by 90°, 3 by 45°, 4 by 25° and 5 for less than 15°).

The Examples and the comparison examples designated below illustrate the invention.

The comparison example 4 shows that a mixture of the initial granulates prior to the precipitation causes no improvement. The comparison example 5 shows that the lower powder limit must be at $\eta_{rel} = 1.50$; comparison example 12 shows that the upper limit may not exceed $\eta_{rel} = 1.65$ and $\eta_{rel} = 1.75$ respectively. Comparison example 6 shows that the difference between the $\eta_{rel}$ units may not be less than 0.04 and comparison example 9 shows that it may not exceed 0.1. Comparison Examples 7 and 8 show that the critical limits of the proportions of the mixture must be between 20:80 and 80:20. Explanation of Tables:

| | Method of Mixing* |
|---|---|
| A | the initial granulates are mixed, the mixture is dissolved and the solution is precipitated; |
| B | the precipitated powders are mixed; |
| C | the granulates are cold ground and then components (I) and (II) are mixed; and |
| D | the granulates of components (I) and (II) are mixed and then the mixture is cold ground. |
| ** | polyamide 11 |
| *** | polyamide powder prepared from mixture of polylauryllactam and a copolyamide of 80% lauryllactam and 20% caprolactam, in a 50:50 ratio |
| **** | polyamide powder prepared from a mixture of polylauryllactam and a copolyamide of 95% lauryllactam and 5% isophoronediamine-dodecanoicdiacid salt in the ratio of 50:50 |
| ***** | mixture of unlike polyamides, namely consisting of a mixture per Example 9 and a mixture per Example 10. |

| | $\eta$ rel | | | mixing ratio | Kind | wire diameter | | | |
|---|---|---|---|---|---|---|---|---|---|
| | Powder | | | I = II | of | of grid | | | |
| Example | I | II | mixture | weight % | mixing* | in mm | pores | edge | elasticity |
| 1 | 1.52 | 1.58 | 1.55 | 50:50 | B | 1 | 0 | 2 | 2 |
| 2** | 1.52 | 1.58 | 1.55 | 50:50 | B | 1 | 0 | 2 | 2 |
| 3 | 1.52 | 1.58 | 1.57 | 20:80 | B | 1 | 0 | 2 | 2 |
| 4 | 1.52 | 1.58 | 1.53 | 80:20 | B | 1 | 0 | 2-3 | 2-3 |
| 5 | 1.58 | 1.65 | 1.62 | 50:50 | B | 3.5 | 0 | 1 | 1 |
| 6 | 1.65 | 1.75 | 1.70 | 50:50 | B | 4.5 | 0 | 1 | 1 |
| 7 | 1.50 | 1.55 | 1.53 | 50:50 | C | 1.5 | 0 | 2 | 2 |
| 8 | 1.50 | 1.55 | 1.53 | 50:50 | D | 1.5 | 0 | 2 | 2 |
| 9*** | 1.58 | 1.65 | 1.62 | 50:50 | B | 3.5 | 0 | 1 | 1 |
| 10*** | 1.58 | 1.65 | 1.62 | 50:50 | B | 3.5 | 0 | 1 | 1 |

| | $\eta$ rel | | | mixing ratio | Kind | wire diameter | | | |
|---|---|---|---|---|---|---|---|---|---|
| Comparison | powder | | | I:II | of | of grid | | | |
| Examples | I | II | mixture | weight % | mixing* | in mm | pores | edge | elasticity |
| 1 | 1.52 | — | — | — | — | 1 | 0 | 5 | 5 |
| 2 | 1.58 | — | — | — | — | 1 | 5 | 2 | 2 |
| 3 | 1.55 | — | — | — | — | 1 | 2 | 3 | 4 |
| 4 | 1.52 | 1.58 | 1.55 | 50:50 | A | 1 | 2 | 3 | 4 |
| 5 | 1.45 | 1.55 | 1.50 | 50:50 | B | 1 | 0 | 5 | 5 |

-continued

| Comparison Examples | η rel powder I | II | mixture | mixing ratio I:II weight % | Kind of mixing* | wire diameter of grid in mm | pores | edge | elasticity |
|---|---|---|---|---|---|---|---|---|---|
| 6 | 1.52 | 1.54 | 1.53 | 50:50 | B | 1 | 0 | 3 | 3 |
| 7 | 1.52 | 1.58 | 1.57 | 10:90 | B | 1 | 2 | 2 | 2 |
| 8 | 1.52 | 1.58 | 1.53 | 90:10 | B | 1 | 0 | 4 | 3–4 |
| 9 | 1.58 | 1.70 | 1.64 | 50:50 | B | 3.5 | 8 | 1 | 2 |
| 10 | 1.58 | — | — | — | — | 3.5 | 0 | 4 | 3–4 |
| 11 | 1.65 | — | — | — | — | 3.5 | 6 | 1 | 2 |
| 12 | 1.70 | 1.80 | 1.75 | 50:50 | B | 4.5 | 20 | 1 | 1 |
| 13***** | 1.58 | 1.65 | 1.62 | 50:50 | B | 3.5 | 2 | 1 | 5 |

The polyamides used in the examples and in the comparison examples having on the average at least nine aliphatically bound carbon atoms per carbonamide group are as follows:

|  | Component I | Component II |
|---|---|---|
| Example | | |
| 1 | polyamide 12 | polyamide 12 |
| 2 | polyamide 11 | polyamide 11 |
| 3 | polyamide 12 | polyamide 12 |
| 4 | polyamide 12 | polyamide 12 |
| 5 | polyamide 12 | polyamide 12 |
| 6 | polyamide 12 | polyamide 12 |
| 7 | polyamide 12 | polyamide 12 |
| 8 | polyamide 12 | polyamide 12 |
| 9 | 50 parts polylauryllactam 50 parts copolyamide of 80% lauryllactam and 20% caprolactam | 50 parts polylauryllactam; 50 parts copolyamide of 80% lauryllactam and 20% caprolactam |
| 10 | 50 parts polylauryllactam and 50 parts copolyamide of 95% lauryllactam and 5% isophoronediamine dodecanoicdiacid salt | 50 parts polylauryllactam and 50 parts copolyamide of 95% lauryllactam and 5% isophoronediamine dodecanoicdiacid salt |
| Comparison Examples | | |
| 1 | polyamide 12 | — |
| 2 | polyamide 12 | — |
| 3 | polyamide 12 | — |
| 4 | polyamide 12 | polyamide 12 |
| 5 | polyamide 12 | polyamide 12 |
| 6 | polyamide 12 | polyamide 12 |
| 7 | polyamide 12 | polyamide 12 |
| 8 | polyamide 12 | polyamide 12 |
| 9 | polyamide 12 | polyamide 12 |
| 10 | polyamide 12 | — |
| 11 | polyamide 12 | — |
| 12 | polyamide 12 | polyamide 12 |
| 13 | 50 parts polylaurinlactam 50 parts copolyamide of 80% lauryllactam and 20% caprolactam | 50 parts polylaurinlactam 50 parts copolyamide of 95% lauryllactam and 5% isophoronediamine and dodecanoicdiacid salt |

What we claim is:

1. A method of preparing a pulverulent polyamide coating composition comprising:
    (a) mixing together granulates of
        (I) 80 to 20% by weight of a first polyamide having on the average at least nine aliphatically bound carbon atoms per carbonamide group and having a relative viscosity of 1.50 to 1.65 as measured in m-cresol at 25° C. for a concentration of 0.5 g/l; and
        (II) 20 to 80% by weight of a second polyamide having on the average at least nine aliphatically bound carbon atoms per carbonamide group and having a relative viscosity of 1.55 to 1.75 as measured in m-cresol at 25° C. for a concentration of 0.5 g/l per German Industrial Standard 53,727, wherein the difference between the relative viscosities of components (I) and (II) is at least 0.04 and at most 0.1 units; and
    (b) cold grinding the mixture.

2. The method of claim 1, wherein components (I) and (II) are aliphatic homopolyamides having the basic block formula:

$$\left[\begin{array}{c} C-(CH_2)_x-NH \\ \parallel \\ O \end{array}\right]$$

wherein x is an integer from 9 to 12.

3. The method of claim 2, wherein component (I) is polylauryllactam.

4. The method of claim 3, wherein component (II) is polylauryllactam.

5. The method of claim 2, wherein component (I) is polyaminoundecanoic acid.

6. The method of claim 5, wherein component (II) is polyaminoundecanoic acid.

7. A method of preparing a pulverulent polyamide coating composition comprising:
    (a) cold grinding a first polyamide having on the average at least nine aliphatically bound carbon atoms per carbonamide group and having a relative viscosity of 1.50 to 1.65 as measured in m-cresol at 25° C. for a concentration of 0.5 g/l per German Industrial Standard 53,727;
    (b) collecting said ground first polyamide as powder component (I);
    (c) cold grinding a second polyamide having on the average at least nine aliphatically bound carbon atoms per carbonamide group and having a relative viscosity of 1.55 to 1.75 as measured in m-cresol at 25° C. for a concentration of 0.5 g/l per German Industrial Standard 53,727, wherein the difference between the relative viscosities of said first and second polyamides is at least 0.04 and at most 0.1 units;
    (d) collecting said ground second polyamide as powder component (II); and
    (e) intimately mixing 80 to 20% by weight of component (I) with 20 to 80% by weight of component (II).

8. The method of claim 7, wherein components (I) and (II) are aliphatic homopolyamides having the basic block formula:

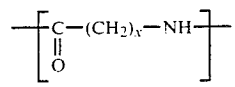
wherein x is an integer from 9 to 12.
9. The method of claim 8, wherein component (I) is polylauryllactam.
10. The method of claim 9, wherein component (II) is polylauryllactam.
11. The method of claim 8, wherein component (I) is polyaminoundecanoic acid.
12. The method of claim 11, wherein component (II) is polyaminoundecanoic acid.
* * * * *